(12) United States Patent
Leuwer et al.

(10) Patent No.: US 10,042,917 B2
(45) Date of Patent: Aug. 7, 2018

(54) METHOD FOR CLASSIFYING A DATA SEGMENT WITH REGARD TO ITS FURTHER PROCESSING

(71) Applicant: Robert Bosch GmbH, Stuttgart (DE)

(72) Inventors: Herbert Leuwer, Backnang (DE); Stefan Kreuz, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 290 days.

(21) Appl. No.: 14/992,155

(22) Filed: Jan. 11, 2016

(65) Prior Publication Data

US 2016/0203210 A1    Jul. 14, 2016

(30) Foreign Application Priority Data

Jan. 13, 2015    (DE) .................. 10 2015 200 301

(51) Int. Cl.
   *G06F 7/00*    (2006.01)
   *G06F 17/30*    (2006.01)
   *H04L 12/851*    (2013.01)
   *H04L 12/743*    (2013.01)

(52) U.S. Cl.
   CPC .... *G06F 17/30598* (2013.01); *G06F 17/3033* (2013.01); *G06F 17/30324* (2013.01); *H04L 47/2441* (2013.01); *H04L 45/7453* (2013.01)

(58) Field of Classification Search
   CPC .......... G06F 17/30324; G06F 17/3033; G06F 17/30598; H04L 47/2441
   See application file for complete search history.

(56) References Cited

U.S. PATENT DOCUMENTS

| | | | | |
|---|---|---|---|---|
| 6,382,122 B1* | 5/2002 | Gaynor | ............... | B63H 21/213 114/144 RE |
| 6,629,247 B1* | 9/2003 | Hall | ......................... | H02J 9/06 307/66 |
| 6,654,355 B1* | 11/2003 | Marbach | ............. | H04L 12/4135 370/285 |
| 7,443,853 B2* | 10/2008 | Kroeger | ................. | H04L 29/06 370/392 |
| 8,681,795 B1* | 3/2014 | Verwillow | .............. | H04L 69/22 370/392 |
| 8,854,972 B1 | 10/2014 | Li | | |
| 9,659,046 B2* | 5/2017 | Sen | ..................... | G06F 17/3033 |
| 2005/0254518 A1* | 11/2005 | Fujimori | ................. | H04L 69/08 370/466 |
| 2007/0140294 A1* | 6/2007 | Takatori | ............ | H04L 12/40032 370/466 |

(Continued)

FOREIGN PATENT DOCUMENTS

EP    1438818 B1    8/2010

OTHER PUBLICATIONS

"Cockoo Hashing" by Ramus Pagh and Glemming Friche Rodler.

*Primary Examiner* — Hasanul Mobin
(74) *Attorney, Agent, or Firm* — Norton Rose Fulbright US LLP; Gerard Messina

(57) ABSTRACT

In a method for classifying a data segment with regard to its further processing in a data transport unit, which data segment includes a header information of a data packet of an encapsulated network protocol, a parameter for the further processing of the data segment is ascertained as a function of a table entry in a lookup table that corresponds to an ascertained key for the lookup table.

14 Claims, 5 Drawing Sheets

(56) References Cited

U.S. PATENT DOCUMENTS

| | | | |
|---|---|---|---|
| 2009/0323708 A1* | 12/2009 | Ihle | G06F 13/28 |
| | | | 370/402 |
| 2010/0011028 A1* | 1/2010 | Dade | G06F 17/3033 |
| | | | 707/E17.037 |
| 2010/0220735 A1* | 9/2010 | Vermunt | H04L 49/90 |
| | | | 370/401 |
| 2011/0202744 A1* | 8/2011 | Kulkarni | G06F 17/3033 |
| | | | 711/216 |
| 2012/0307836 A1* | 12/2012 | Ishigooka | H04L 12/4625 |
| | | | 370/401 |
| 2014/0214855 A1* | 7/2014 | Attaluri | G06F 17/3033 |
| | | | 707/747 |
| 2015/0269279 A1* | 9/2015 | Bosshart | G06F 17/3033 |
| | | | 707/798 |
| 2015/0370720 A1* | 12/2015 | Rowlands | G06F 12/0891 |
| | | | 711/133 |

* cited by examiner

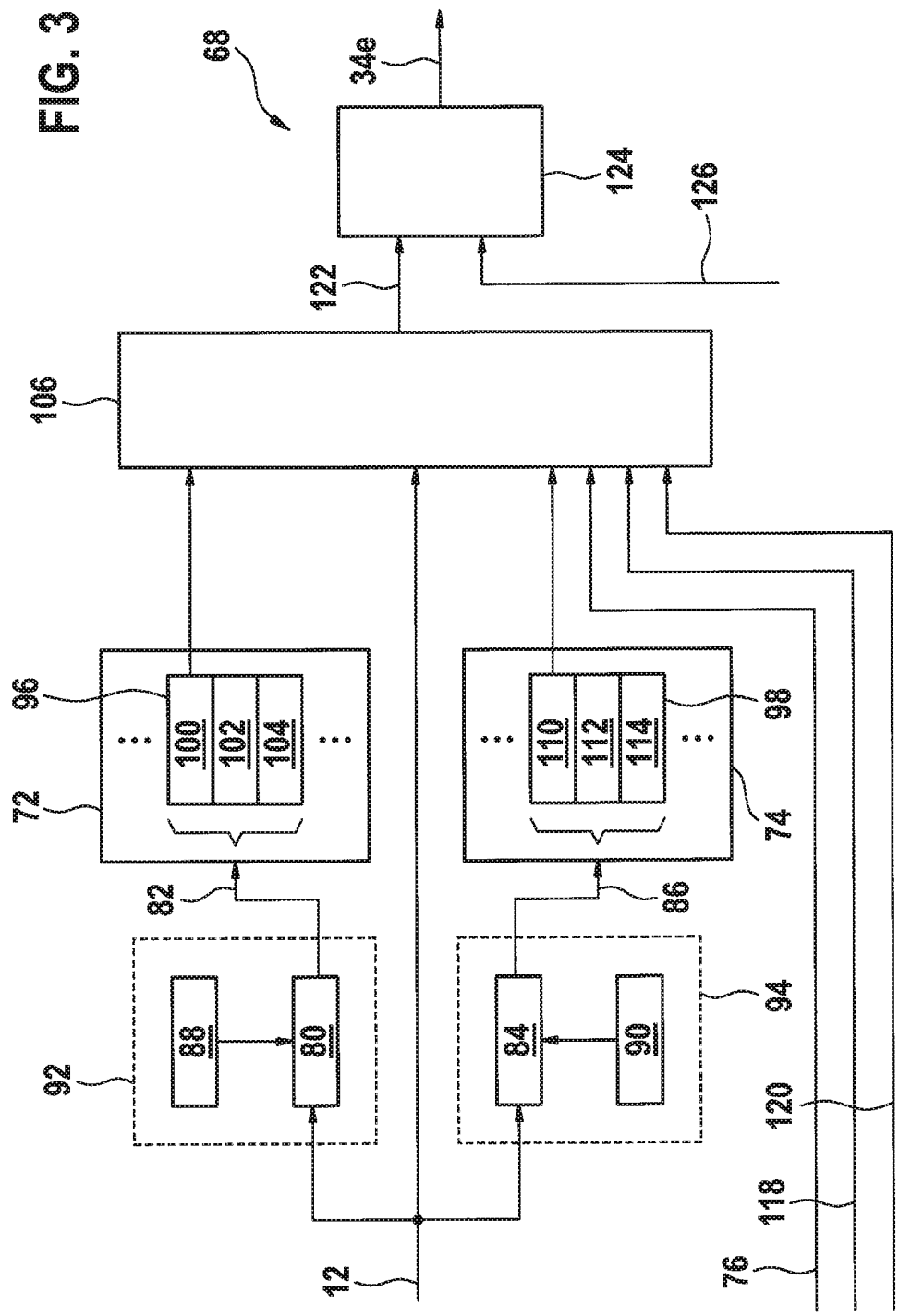

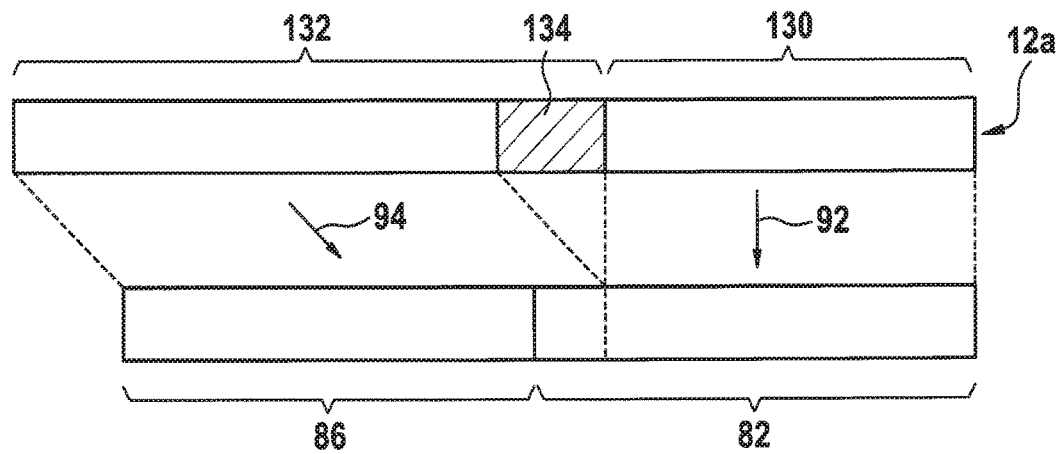
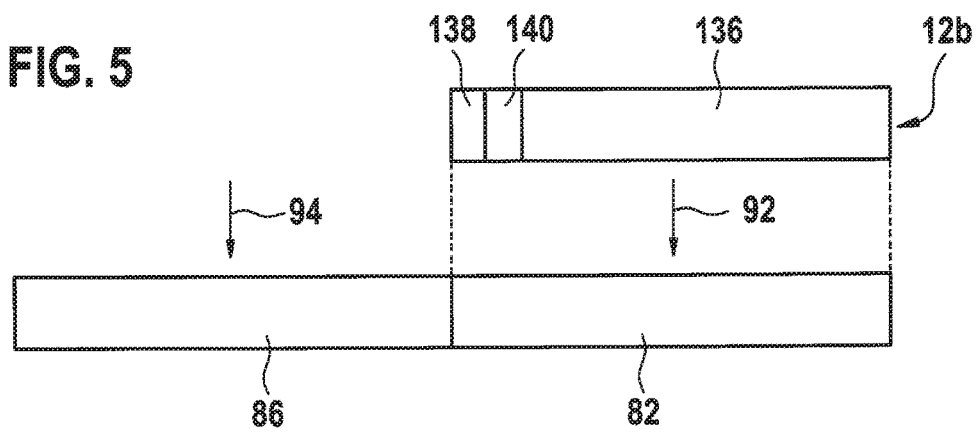
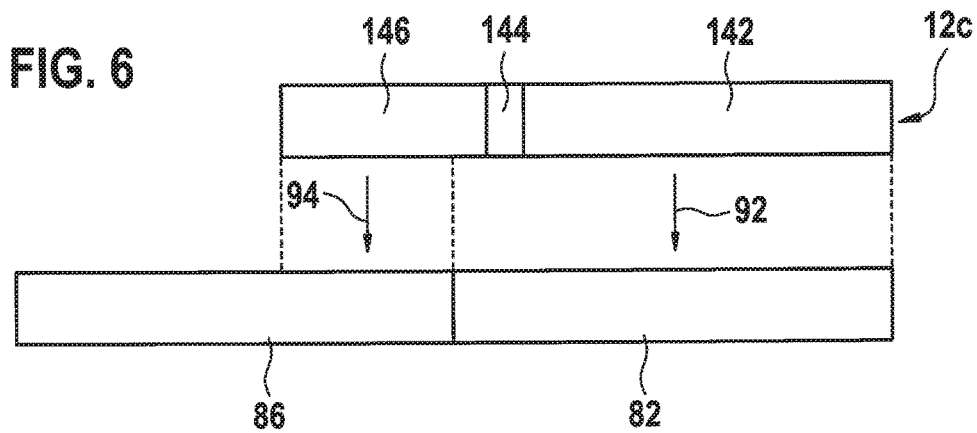

METHOD FOR CLASSIFYING A DATA SEGMENT WITH REGARD TO ITS FURTHER PROCESSING

BACKGROUND OF THE INVENTION

1. Field of the Invention

The present invention relates to a method for classifying a data segment with regard to its further processing.

2. Description of the Related Art

It is known that communication controllers for networks, such as CAN (Controller Area Network), Extended CAN, or FlexRay can have a filter function for respective data packets in order to filter out and observe only a segment of the network traffic.

For network transition units, or gateways, data packet filters based on large communication matrices can be realized at great expense with regard to the data memory. In particular, the increased number of network types and the increased number of subnetworks in the automotive area make the construction of a flexible gateway unit between different networks more difficult.

From the publication "Cuckoo Hashing" by authors Rasmus Pagh and Glemming Friche Rodler, so-called cuckoo hashing is known.

BRIEF SUMMARY OF THE INVENTION

In order to ascertain a parameter for further processing of a data segment, a corresponding key is selected for a lookup table as a function of a first and second table entry of a respective hash table, using a selection function. Advantageously, through the use of two hash tables and two different hash functions, the method can be executed so as to terminate, while at the same time the number of wrong ascertainments of the key, and thus incorrect pass-through of data segments, is greatly reduced.

In an advantageous specific embodiment, a first hash function ascertains a first subregion of the header information as first hash value. In this way, a simple hash function is provided that can unproblematically be executed so as to terminate.

In an advantageous specific embodiment, the second hash function ascertains a second subregion of the header information, or a fixed value, as second hash value. In this way, a simple hash function is provided that can unproblematically be executed so as to terminate.

In an advantageous specific embodiment, a pass bit index is ascertained as a function of a previously determined identifier and as a function of an identifier of an input interface from which the data segment originates. The key is selected for the lookup table as a function of two pass bits situated at a location defined by the pass bit index in respective bit sequences of the table entries. Through the use of the pass bits from the bit sequences of the respective table entries, the non-injectivity of the hash function used is advantageously compensated. This makes it possible, in particular in relation to the input interface in the case of a collision due to at least partially identical content of the header information, to decide whether hash table entries are opened, i.e. data segments mapped to them are used, or not, in order in this way to achieve a more precise filtering of the data segments.

In an advantageous specific embodiment, the header information includes an extended CAN identifier, the first subregion including a first part of the extended CAN identifier or part thereof, and the second subregion including a second part of the extended CAN identifier or a part thereof.

In an advantageous specific embodiment, in order to ascertain the first and/or second subregion, a number of bits, in particular three bits, of the extended CAN identifier are suppressed.

In an advantageous specific embodiment, the header information includes a standard CAN identifier, the first subregion including the standard CAN identifier and the second subregion being zero at all locations.

In an advantageous specific embodiment, the header information includes a FlexRay identifier, the first subregion including the FlexRay identifier, a FlexRay channel bit and a first part of a FlexRay cycle field, and the second subregion including a second part of the FlexRay cycle field.

In an advantageous specific embodiment, a second key is ascertained for the lookup table as a function of a previously defined identifier and as a function of an identifier of the input interface from which the data segment originates, the parameter for the further processing of the data segment being ascertained as a function of the first key and the second key from the lookup table.

In an advantageous specific embodiment, the first and second key are stored for a first of the data segments of one of the data blocks, and as a function of the stored first and the stored second key the parameters for further processing of the plurality of data segments are ascertained from the lookup table.

In an advantageous specific embodiment, one of the parameters for the further processing of the data segment identifies a queue into which the data segment is written.

In an advantageous specific embodiment, one of the parameters for the further processing of the data segment identifies a processing unit to which the data segment is provided.

In an advantageous specific embodiment, the data segment is discarded when, on the basis of the first key and/or on the basis of the second key, no parameters for the further processing of the data segment are ascertained from the lookup table.

A circuit for carrying out the method is configured at a configuration time outside the circuit, the first hash table and the second hash table being filled using cuckoo hashing. This has the advantage that the number of incorrectly forwarded data segments is greatly reduced. This is due to the fact that the cuckoo hashing advantageously achieves a better distribution of the table entries in both tables.

Further features, possible uses, and advantages of the present invention result from the following description of exemplary embodiments of the present invention, shown in the Figures of the drawings. The same reference characters are used for functionally equivalent quantities and features in all the Figures, even in different specific embodiments.

In the following, exemplary specific embodiments of the present invention are explained with reference to the drawing.

BRIEF DESCRIPTION OF THE DRAWINGS

FIG. 3 shows a schematic block diagram of block 68 of FIG. 2.

FIG. 4 shows a schematic header information 12a of an extended CAN protocol.

FIG. 5 shows a schematic header information 12b of a standard CAN protocol.

FIG. 6 shows a schematic header information 12b of a FlexRay protocol having a FlexRay identifier 142, a FlexRay channel bit 144, and a FlexRay cycle field 146.

DETAILED DESCRIPTION OF THE INVENTION

Figure 1:
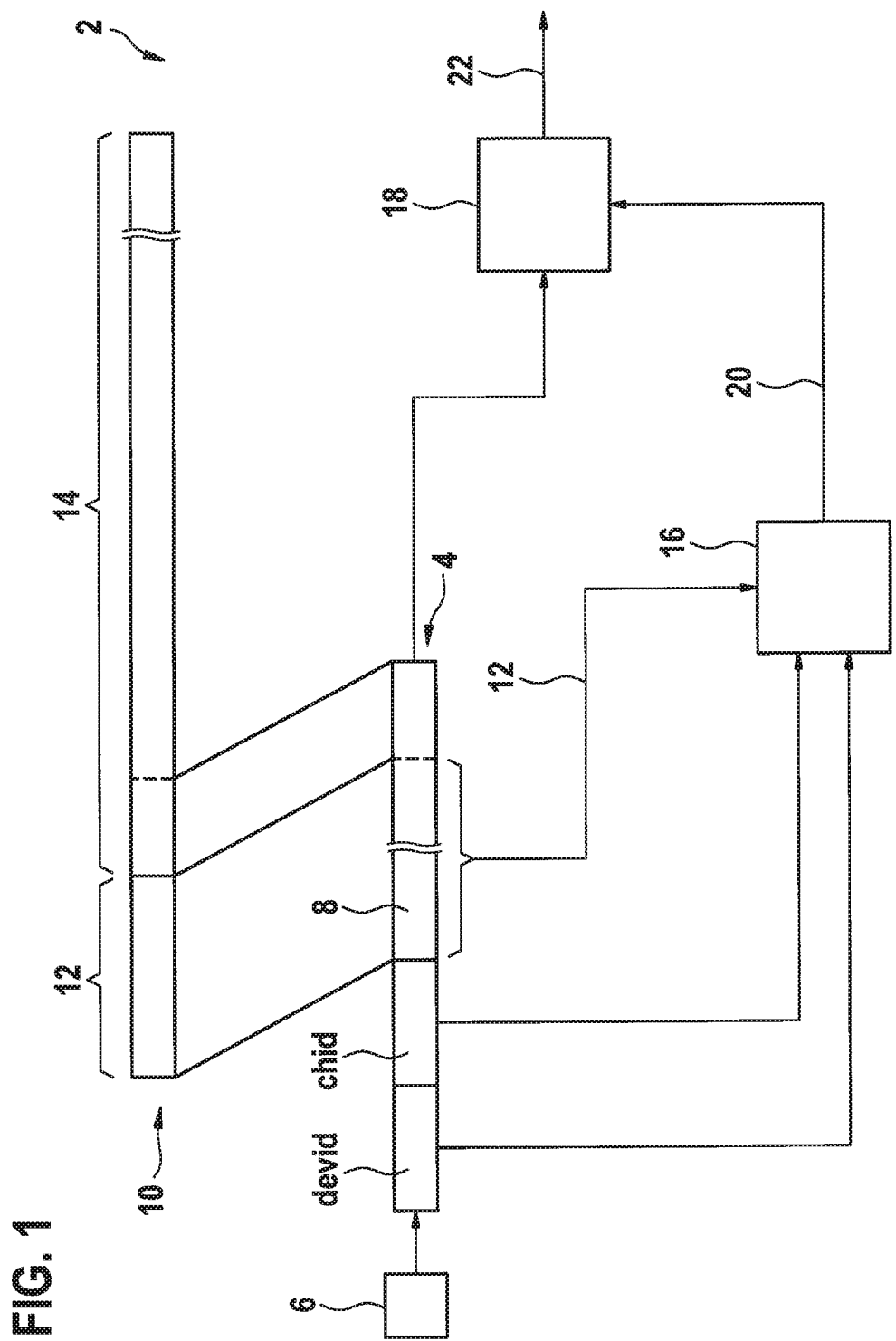
FIG. 1 shows a schematic block diagram illustrating the relationship between a data segment 4 and a data packet 10.

FIG. 1 shows a schematic block diagram 2. A data segment 4 is provided by an input interface 6. Data segment 4 includes a previously defined identifier chid, also referred to as channel identifier. In addition, data segment 4 includes an identifier devid of input interface 6. In addition, data segment 4 includes a data region 8, also designated the payload of data segment 4. In addition, data segment 4 can contain further information, for example the position of data segment 4 as part of a data block including a plurality of data segments 4.

A data packet 10 of an encapsulated network protocol includes a header information 12 as well as a data region 14. As shown in FIG. 1, data region 8 of data segment 4 includes only a part of data packet 10. As an example, data segment 4 in FIG. 1 is a first of a plurality of data segments 4 for the transmission of data packet 10.

The previously agreed-upon identifier chid, the identifier devid of input interface 6, and, in the case of a first data segment 4, header information 12, of data packet 10 is provided to a block 16. As a function of the provided quantities, block 16 ascertains parameters 20 for the further processing of data segment 4 from a lookup table (explained below). In this way, block 16 classifies a data segment 4 with regard to its further processing in a data transport unit, in particular in a network processor, the data transport unit including at least block 16 and a block 18, parameters 20 and corresponding data segment 4 being provided to block 18. In accordance with an arrow 22, block 18 forwards data segments 4 for which parameters 20 could be ascertained to one or more output interfaces (not shown).

Data packet 10 can be for example a CAN data packet, a FlexRay data packet, an XCP data packet (universal measurement calibration protocol), a CCP data packet (CAN calibration protocol), or an Ethernet data packet. Of course, in this context other network protocols not named here are also conceivable.

One of the parameters 20 identifies for example a queue inside block 18 for the further processing of data segment 4, with which parameter 20 unambiguously identifies a processing unit for the further processing of data segment 4, because each queue is fixedly assigned to a data processing unit.

Advantageously, all methods described here are realized such that block 16 is terminating, i.e. for an input in the form of a data segment 4 it produces, in a finite number of processing steps, an output in the form of parameters 20. Therefore, block 16 can advantageously be fashioned as an integrated circuit. An integrated circuit includes for example an ASIC (application-specific integrated circuit) or else an FPGA (field-programmable gate array).

Figure 2:
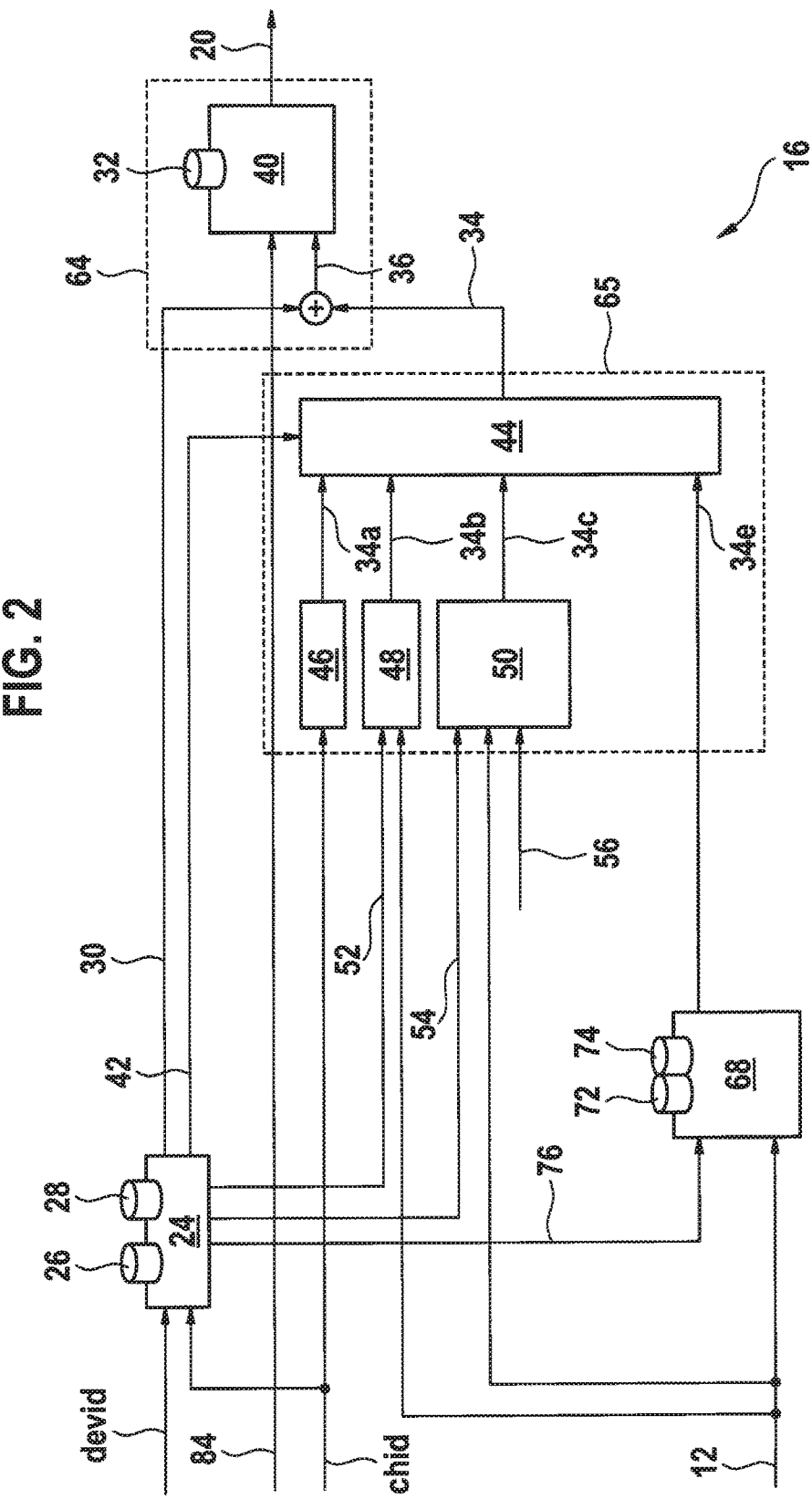
FIG. 2 shows, in a schematic block diagram, a segment of block 16 that classifies a data segment 4 with regard to its further processing.

FIG. 2 shows, in a schematic block diagram, a segment of block 16 that classifies a data segment 4 with regard to its further processing by ascertaining parameters for the further processing of the data segment. Of course, the classification of a single data segment also includes the classification of the data block that has a plurality of data segments. Thus, for example, as explained below, a header information in a first data segment of a data block can advantageously be used to ascertain corresponding parameters that are also used for the data segments following the first data segment of the data block, for the further processing thereof.

The previously defined identifier chid and the identifier devid of input interface 6 are provided to a block 24. The output quantities of block 24 are formed as a function of the previously defined identifier chid and the identifier devid of input interface 6. Block 24 accesses a first preconfigurable table 26 and a second preconfigurable table 28. In a first case, a second key 30 can be ascertained using table 26 on the basis of the identifier devid of input interface 6. In a different case, with the aid of the previously agreed-upon identifier chid in addition to the identifier devid, via the table 28 the second key 30 can be ascertained as a function of the identifier devid of input interface 6 and the previously agreed-upon identifier chid. Via second key 30, for example storage regions in lookup table 32 can be addressed that are assigned to one of the input interfaces 6, or else are assigned to one of the input interfaces 6 and to the previously agreed-upon identifier chid.

Second key 30 and a first key 34 are provided to a region 64. From second key 30 and first key 34, a lookup key 36 is formed, for example through addition of second key 30 and first key 34. In the addition, first key 34 represents for example an offset to second key 30. Of course, other combinations of second key 30 and first key 34 are conceivable for ascertaining lookup key 36.

A block 40 accesses preconfigurable lookup table 32 as a function of lookup key 36, and thus ascertains from lookup table 32 parameters 20 for the further processing of data segment 4 that is being processed. Via an item of information 84, it is communicated to block 40 whether the investigated data segment 4 is a last, first, or middle data segment 4 of the data block or data packet 10. If block 40 cannot ascertain any parameter or parameters 20 for the provided lookup key 36 in lookup table 32 for the further processing of data segment 4, data segment 4 is not further processed and is discarded. Through the rejection of a data segment 4 that is not acquired through a pre-configuration in lookup table 32, advantageously no filter elements need be provided before input interface 6 in the region of the respective network, and the filtering of the data streams of different subnetworks, or network types, can advantageously be carried out in centralized fashion by block 16. In addition, a hardware implementation of block 16 is a further improvement.

According to signal 42, it is signaled to a block 44 which of the input signals of block 44 is forwarded as first key 34.

Block 46 ascertains a first key 34a as a function of the previously defined identifier chid.

Block 48 produces a first key 34b as a function of header information 12 of data packet 10 and as a function of a signal 52, signal 52 being produced by block 24 and communicating to block 48 which protocol and which region of header information 12 is to be evaluated.

A block 50 is an XCP classifier for the XCP (universal measurement calibration protocol) transported via the Ethernet protocol. Via signal 54, block 24 communicates to block 50 at which location the XCP header is present in the data, because XCP is transmitted for example via Ethernet, CAN, or FlexRay, and the header information 12 to the network types thus differ, and thus the position of the XCP header is also present at another, or different, position. Via a signal 56, block 50 is given information regarding the start position of the XCP header in header 12, and information regarding the coding of the XCP header.

A block 65 is thus used to produce and select first key 34. First key 34 is formed in particular through evaluation of header information 12. Thus, a FRAME-ID (data frame identification) from header information 12, and in particular an origin address and/or target address in header information 12, can advantageously be evaluated in such a way that an unambiguous connection can be produced between devid, chid, header information 12, and parameters 20, i.e. an entry in lookup table 32.

Block 68 accesses a first hash table 72 and a second hash table 74. Block 68 produces a first key 34e. Block 24 provides to block 68 a pass bit index 76 (explained below) that is ascertained as a function of the identifiers devid and chid, for example using a corresponding conversion table.

FIG. 3 shows a schematic block diagram of block 68 of FIG. 2. Header information 12 is provided to a block 80 for the production of a first hash value 82. Header information 12 is provided to a block 84 for the production of a second hash value 86. Block 80 links a bit mask 88 with header information 12 according to an AND operation, and low-value bits of header information 12 form first hash value 82. Block 68 ascertains, in a form not shown, a TLV type (Type Length Value) of header information 12, i.e. whether header information 12 is standard CAN, extended CAN, or FlexRay. Thus, preferably 13 bits are sought from the TLV format of header information 12 and are combined to form first hash value 82. Bit mask 88 and block 80 are together designated first hash function 92. First hash function 92 ascertains bit mask 88 as a function of the TLV type of header information 12.

Block 84 links a bit mask 90 with header information 12 according to an AND operation, high-value bits of header information 12 forming second hash value 86. In this way, preferably 13 bits are sought from the TLV format of header information 12 and are combined to form second hash value 86. Bit mask 90 and block 84 are together designated second hash function 94. Second hash function 94 ascertains bit mask 90 as a function of the TLV type of header information 12. In the preferred specific embodiment, first hash value 82 and second hash value 86 each have 13 bits. Of course, a different number of bits from header information 12 can also be selected for hash values 82 and 86.

First hash value 82 indexes a first table entry 96 in first hash table 72. Second hash value 86 indexes a second table entry 98 in second hash table 74. First table entry 96 of first hash table 72 includes a first designator 100, a first bit sequence 102, and a second bit sequence 104. Second table entry 98 of second hash table 74 includes a second designator 110, a first bit sequence 112, and a second bit sequence 114.

First designator 100, second hash value 86, first hash value 82, second designator 110, pass bit index 76, a discard key 118, and a pass key 120 are supplied to a block 106. In addition, bit sequences 102, 104, 112, and 114 of the respective entries 96 and 98 are provided to block 106. Block 106, whose function is explained in more detail in FIG. 7, selects either discard key 118 or pass key 120 as selected key 122, and forwards the key 122 to a block 124. Pass key 120 points to an entry in lookup table 32 that contains parameters 20 for further processing. A parameter for further processing points for example to a number of one or more queues in which data segment 4 is positioned. Thus, multicast groups of queues can be formed, data segment 4 being positioned in each queue of the multicast group.

In contrast, discard key 118 points to an entry in lookup table 32 that contains parameters 20 that result either in a discarding of data segment 4 or in forwarding to a debugging queue. The debugging queue is evaluated by a debug function in order to correspondingly prepare the received data segments 4 for example for an error search in the received data traffic. Of course, multicast groups of debug queues can also be formed for discard key 118.

Block 124 either selects a default key as first key 34e, if no frame content is present in data segment 4, i.e. if the TLV type is not of the type CAN or of the type FlexRay; or block 124 selects just-ascertained key 122 as first key 34e. This is communicated to block 124 by a signal 126.

FIG. 4 shows a schematic header information 12a of an extended CAN protocol, header information 12 including an extended CAN identifier. Extended CAN identifier 128 includes a first part 130 that has a number of 11 bits, and a second part 132 that has a number of 18 bits. According to first hash function 92, a number of bits, in the present case three bits 134, of the low-valued bits of second part 132 are not taken into account, and first hash value 82 results from first part 130 and the two lowest-value bits of second part 132. Second hash value 86 results, according to second hash function 94, from the remaining 13 high-value bits of second part 132. Of course, the bits 134 not taken into account can also be selected somewhere else.

First hash value 82 is also designated first subregion of header information 12, the first subregion addressing low-value bits of header information 12. Second hash value 86 is also designated second subregion of header information 12, the second subregion addressing high-value bits of header information 12.

FIG. 5 shows a schematic header information 12b of a standard CAN protocol, this information including a standard CAN identifier 136 having a number of 11 bits, and two additional bits 138 and 140. First hash value 82 is formed from header information 12b according to first hash function 92. Second hash value 86 is filled with a fixed value, for example only zeroes or only ones.

FIG. 6 shows a schematic header information 12b of a FlexRay protocol having a FlexRay identifier 142, a FlexRay channel bit 144, and a FlexRay cycle field 146. First hash value 82 is formed according to first hash function 92. Second hash value 86 is formed according to second hash function 94.

Figure 7:
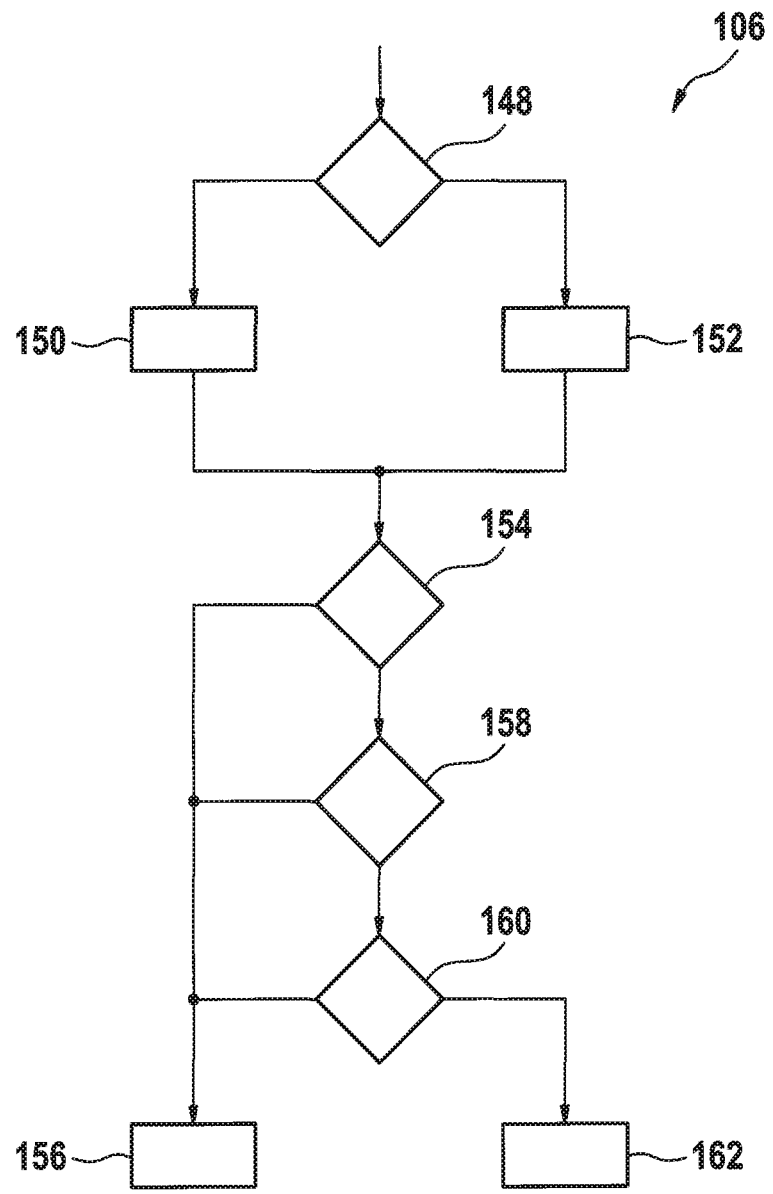
FIG. 7 shows a schematic flow diagram of block 106 of FIG. 2.

FIG. 7 shows a schematic flow diagram of block 106 of FIG. 2. At a location 148 it is checked whether data segment 4 being examined having header information 12 is a data segment 4 of an encapsulated extended CAN protocol. If yes, then in a step 150 a first pass bit is ascertained at a location of bit sequence 102 determined by pass bit index 76, and a second pass bit is ascertained at the location of bit sequence 112 determined by pass bit index 76. If data segment 4 is not a segment of an extended CAN protocol, then in a step 152 the first pass bit is ascertained at the location of bit sequence 104 determined by pass bit index 76, and the second pass bit is ascertained at the location of bit sequence 114 determined by pass bit index 76. Bit sequences 102 and 112 are preconfigured for extended CAN. Bit sequences 104 and 114 are preconfigured for the other encapsulated network protocols such as standard CAN and FlexRay.

At a location 154, the first and second pass bit are evaluated. If both pass bits are one, i.e. the two pass bits are "true" according to Boolean algebra, then in step 156 pass key 120 is selected for forwarding; otherwise, i.e. if at least one of the two pass bits is zero, i.e. is "false" according to Boolean algebra, a change is made to a location 158.

At location 158, header information 12 is linked to first designator 100. If first designator 100 can be found at least in a subregion of header information 12, then in step 156 a change is made; otherwise a change is made to a location 160.

At location 160, header information 12 is linked to second designator 110. If second designator 110 can be found at least in a subregion of header information 12, then a change takes place in step 156; otherwise, in a step 162, discard key 118 is selected for forwarding.

In a preferred specific embodiment, first designator 100 and associated first hash value 82 are selected as disjunct parts of header information 12. Likewise, second designator 110 and second hash value 86 are selected as disjunct parts of header information 12. If header information 12 has a number of 29 bits, then 13 low-value bits are ascertained as first hash value 82, and 16 high-value bits are ascertained as first designator 100. A number of 13 high-value bits is ascertained as second hash value 86, and a number of 16 low-value bits is ascertained as second designator 110. Of course, a different partitioning is possible, also into regions that do not make use of the total number of bits of header information 12. Of course, the overall header information 12 can also be stored as designator 100 or 110. Therefore, during the runtime it is advantageously possible on the one hand to compare the received header information 12 with an expected header information according to designator 100 or 110, and on the other hand to keep the storage space for designator 100, 110 small due to the reduction from 29 to 16 bits. In this way, a compromise is reached between required memory space and reliable recognition and assignment of header information 12. The production of table entries 96 and 98 takes place during the configuration time, and the use of table entries 96 and 98 takes place during the runtime.

First key 34e for lookup table 32 is selected as a function of first and second table entry 96, 98 according to a selection function, according to block 106. The functional dependence of first key 34e on first and second table entry 96, 98 means that both table entries 96, 98 are queried in order to ascertain first key 34e.

For the configuration of the circuit, at the time of configuration the first hash table 72 and second hash table 74 are filled, using cuckoo hashing, outside the circuit, or on a processor unit. For this purpose, when there is a new entry to be added the process starts with first hash table 72; the cuckoo hashing algorithm adds the new entry in hash table 72 if space is available there. If the corresponding space is occupied, an attempt is made to shift the entry there into hash table 74. If an occupied space is found there as well, it is again attempted to shift the entry there into hash table 72. If the entry cannot be added because all shift attempts by the cuckoo hashing between the tables have been unsuccessful, then the process is begun with hash table 74. If insertion into hash table 74 is also unsuccessful, then the bits are set to one either in the two bit sequences 102 and 112 or in the two bit sequences 104 and 114, i.e. as a function of the presence of a header information 12 according to extended CAN, at a location determined by pass bit index 76. Pass bit index 76 is determined as a function of the identifiers devid and chid, which together identify one of a plurality of input interfaces 6. If first and second hash table 72, 74 are completed, these are loaded onto the integrated circuit in the corresponding memory unit. Through the provision and use of the pass bit, during the runtime it is possible to resolve hashing collisions. In particular, in this way it is not necessary to recognize these collisions during the runtime. However, the above measures are taken in the sense of the provision of the hash values and the pass bits in order to efficiently resolve as many hash collisions as possible during the runtime. On the other hand, not all possible collisions can be foreseen, for which reason a reduced leakage, i.e. a collision resulting in an incorrect treatment of data segments 4, is accepted.

What is claimed is:

1. A method for classifying a data segment with regard to its further processing in a data transport unit, the data segment including a header information of a data packet of an encapsulated network protocol, the method comprising:
   ascertaining a first hash value as a function of the header information, which acts as search key, using a first hash function;
   ascertaining a second hash value as a function of the header information, which acts as search key, using a second hash function;
   ascertaining a first table entry in a first hash table as a function of the first hash value;
   ascertaining a second table entry in a second hash table as a function of the second hash value;
   selecting, using a selection function, a first key for a lookup table, as a function of the first and second table entry; and
   ascertaining a parameter for the further processing of the data segment as a function of a table entry in the lookup table which corresponds to the first key for the lookup table;
   wherein the first hash function ascertains a first subregion of the header information as first hash value,
   wherein the second hash function ascertains one of a second subregion of the header information or a fixed value as second hash value,
   wherein the header information includes a FlexRay identifier,
   wherein the first subregion includes the FlexRay identifier, a FlexRay channel bit, and a first part of a FlexRay cycle field, and
   wherein the second subregion includes a second part of the FlexRay cycle field.

2. The method as recited in claim 1, wherein:
   a pass bit index is ascertained as a function of a previously defined identifier and as a function of an identifier of an input interface from which the data segment originates; and
   the first key for the lookup table is selected as a function of two pass bits located at a position defined by the pass bit index in respective bit sequences of the first and second table entries.

3. The method as recited in claim 1, wherein a second key for the lookup table is ascertained as a function of a previously defined identifier and as a function of an identifier of the input interface from which the data segment originates, and the parameter for the further processing of the data segment is ascertained as a function of the first key and the second key from the lookup table.

4. The method as recited in claim 3, wherein the first and second keys are stored for a first of the data segments of one of the data blocks, and the parameters for the further processing of the plurality of data segments are ascertained from the lookup table as a function of the stored first key and the stored second key.

5. The method as recited in claim 4, wherein one of the parameters for the further processing of the data segment identifies a queue into which the data segment is written.

6. The method as recited in claim 3, wherein the data segment is discarded if, on the basis of at least one of the first key and the second key, no parameters are ascertained for the further processing of the data segment from the lookup table.

7. The method as recited in claim 3, wherein the first hash table and the second hash table are filled, using cuckoo hashing.

8. A non-statutory computer-readable data storage medium storing a computer program, which is executable by a processor, comprising:
 a program code arrangement having program code for classifying a data segment with regard to its further processing in a data transport unit, the data segment including a header information of a data packet of an encapsulated network protocol, by performing the following:
  ascertaining a first hash value as a function of the header information, which acts as search key, using a first hash function;
  ascertaining a second hash value as a function of the header information, which acts as search key, using a second hash function;
  ascertaining a first table entry in a first hash table as a function of the first hash value;
  ascertaining a second table entry in a second hash table as a function of the second hash value;
  selecting, using a selection function, a first key for a lookup table, as a function of the first and second table entry; and
  ascertaining a parameter for the further processing of the data segment as a function of a table entry in the lookup table which corresponds to the first key for the lookup table;
  wherein the first hash function ascertains a first subregion of the header information as first hash value,
  wherein the second hash function ascertains one of a second subregion of the header information or a fixed value as second hash value,
  wherein the header information includes a FlexRay identifier,
  wherein the first subregion includes the FlexRay identifier, a FlexRay channel bit, and a first part of a FlexRay cycle field, and
  wherein the second subregion includes a second part of the FlexRay cycle field.

9. The data storage medium as recited in claim 8, wherein:
 a pass bit index is ascertained as a function of a previously defined identifier and as a function of an identifier of an input interface from which the data segment originates; and
 the first key for the lookup table is selected as a function of two pass bits located at a position defined by the pass bit index in respective bit sequences of the first and second table entries.

10. The data storage medium as recited in claim 8, wherein a second key for the lookup table is ascertained as a function of a previously defined identifier and as a function of an identifier of the input interface from which the data segment originates, and the parameter for the further processing of the data segment is ascertained as a function of the first key and the second key from the lookup table.

11. The data storage medium as recited in claim 10, wherein the first and second keys are stored for a first of the data segments of one of the data blocks, and the parameters for the further processing of the plurality of data segments are ascertained from the lookup table as a function of the stored first key and the stored second key.

12. The data storage medium as recited in claim 11, wherein one of the parameters for the further processing of the data segment identifies a queue into which the data segment is written.

13. The data storage medium as recited in claim 10, wherein the data segment is discarded if, based on at least one of the first key and the second key, no parameters are ascertained for the further processing of the data segment from the lookup table.

14. The data storage medium as recited in claim 10, wherein the first hash table and the second hash table are filled, using cuckoo hashing.

* * * * *